(12) United States Patent
Matsuzaki et al.

(10) Patent No.: US 6,626,007 B1
(45) Date of Patent: Sep. 30, 2003

(54) CAPACITOR

(75) Inventors: Yuichi Matsuzaki, Konan (JP); Yoshihisa Eto, Konan (JP); Isao Ogawa, Konan (JP)

(73) Assignee: Zexel Valeo Climate Control Corporation, Saitama (JP)

( * ) Notice: Subject to any disclaimer, the term of this patent is extended or adjusted under 35 U.S.C. 154(b) by 0 days.

(21) Appl. No.: 09/936,948

(22) PCT Filed: Mar. 17, 2000

(86) PCT No.: PCT/JP00/01624

§ 371 (c)(1),
(2), (4) Date: Sep. 20, 2001

(87) PCT Pub. No.: WO00/57116

PCT Pub. Date: Sep. 28, 2000

(30) Foreign Application Priority Data

Mar. 23, 1999  (JP) .......................................... 11-077758

(51) Int. Cl.[7] .......................... F25B 39/04; F25B 43/00
(52) U.S. Cl. .......................................... 62/509; 62/503
(58) Field of Search ........................ 62/503, 509, 525; 165/173, 178, 285

(56) References Cited

U.S. PATENT DOCUMENTS 5,477,919 A   12/1995  Karube
5,526,876 A *  6/1996  Karube ........................ 165/176
5,911,274 A    6/1999  Inaba et al.

FOREIGN PATENT DOCUMENTS

| JP | 5-203387 | * | 8/1993 | .................. 165/41 |
| JP | 6-229696 | * | 8/1994 | .................. 195/178 |
| JP | 9-184667 |   | 7/1997 |  |

* cited by examiner

Primary Examiner—Denise L. Esquivel
Assistant Examiner—Melvin Jones
(74) Attorney, Agent, or Firm—Wenderoth, Lind & Ponack, L.L.P.

(57) ABSTRACT

In order to ensure that a braising material applied onto the surface of a header pipe does not enter communicating passages for coolant intake/outlet at a connecting block during the furnace braising process implemented to weld the connecting block utilized to connect a liquid tank to the header pipe, pipe-like projections are formed at the pair of communicating passages for coolant intake/outlet formed at the connecting block for liquid tank connection on the side where the header pipe is connected and the pipe-like projections inserted at holes of the header pipe clad with a braising material are welded to a condenser to constitute an integrated part thereof.

20 Claims, 6 Drawing Sheets

1

CAPACITOR

TECHNICAL FIELD

The present invention relates to a condenser mainly utilized in an air-conditioning system for vehicles, which is constituted by providing a liquid tank next to a header pipe and connecting the liquid tank to the header pipe via a connecting block.

BACKGROUND ART

A condenser is normally connected to a coolant piping by securing a connecting block to a header pipe of the condenser and bonding an end of the coolant piping to the connecting block. For instance, as disclosed in Japanese Unexamined Patent Publication No. H 10-141888, a communicating hole 12 is formed at a connecting block 8, a hole 4a is formed at a header pipe 4 as well and the header pipe and the connecting blocked are bonded to each other through furnace brazing with the communicating hole 12 and the hole 4a aligned with each other.

In addition, if a liquid tank is provided next to either one of the header pipes, a structure illustrated in FIG. 8, for instance, may be assumed by bonding the liquid tank to the header pipe via a connecting block. In this example, numerous flat tubes 2 are inserted at a header pipe 1 over appropriate intervals and a partitioning plate 3 for partitioning the header pipe 1 is provided at an appropriate position in the header pipe 1. Holes 4 and 5 are formed on opposite sides of brazing the partitioning plate 3 at the header pipe 1. It is to be noted that the surface of the header pipe 1 is clad with a brazing material.

At a connecting block 6, an intake-side communicating passage 7 and an outlet-side communicating passage 8 are formed, connecting stages (for housing O-rings for sealing) 7a and 8a of the communicating passages 7 and 8 are formed on the front side, the rear side of the connecting block 6 is formed as a straight surface, the communicating passages 7 and 8 are aligned with the holes 4 and 5 of the header pipe 1 and the brazing material on the surface of the header pipe 1 melts to weld the connecting block 6 to the header pipe 1 during the furnace brazing process.

However, while the connecting block 6 is welded onto the header pipe 1, the brazing material melting from the surface of the header pipe 1 enters the communicating passages 7 and 8 via the brazing surface to reach the connecting stages 7a and 8a which are not brazing surfaces to lower the surface accuracy of the connecting stages 7a and 8a. As a result, the sealing function achieved through the O-rings is compromised to cause a coolant leak.

Accordingly, an object of the present invention is to ensure that the sealing function achieved at the connecting stages is not compromised by preventing the brazing material at the surface of the header pipe from entering the communicating passages for coolant intake/outlet at the connecting block during the furnace brazing process.

DISCLOSURE OF THE INVENTION

In the condenser according to the present invention having a liquid tank, which is also provided with a header pipe at least on one side with the liquid tank set next to the header pipe, a connecting block utilized to connect the liquid tank is provided with a pair of communicating passages for coolant intake/outlet, pipe-like projections are formed at the communicating passages on the side where the connecting block is connected to the header pipe and the connecting block is welded to the header pipe with the pipe-like projections inserted at holes formed at the header pipe clad with a brazing material, and the pipe-like projections are located between flat tubes inserted and fixed to the header pipes.

Thus, since the pipe-like projections at the connecting block utilized to connect the liquid tank are projected between the flat tubes inserted and fixed to the header pipes, the brazing material at the surface of the header pipe is not allowed to enter the communicating passages even when it melts, to ensure that the sealing function achieved at the connecting stages is not compromised, and even if the pipe-like projections are inserted into the header pipes and project inside thereof, they can avoid interfering with the flat tubes.

In addition, the pitch of the pipe-like projections at the pair of communicating passages formed at the connecting block is an integral multiple of the pitch of the flat tubes inserted at and connected to the header pipe.

Furthermore, the pipe-like projections at the communicating passages of the connecting block are loosely inserted at the holes formed at the header pipe. Alternatively, the pipe-like projections at the communicating passages of the communicating block may be fitted inside the holes formed at the header pipe through press fitting.

As described above, the pipe-like projections are loosely inserted at the holes formed at the header pipe with a clearance or they are fitted inside the holes formed at the header pipe through press fitting by setting the diameter of the holes at the header pipe almost equal to the external diameter of the pipe-like projections. In the latter case, a temporary retention of the connecting block to the header pipe which must be achieved prior to the brazing process is realized.

The distance over which the pipe-like projections at the communicating passages of the connecting block project out is set larger than the wall thickness of the header pipe. Since this allows the pipe-like projections to project out into the header pipe, the melted brazing material cannot enter the communicating passages.

Note that while the shape of the pipe-like projections at the communicating passages of the communicating block normally have a circular section, they may be formed to have a flat section to be used in conjunction with flat tubes set over smaller intervals (smaller pitch).

BEST MODE FOR CARRYING OUT THE INVENTION

The following is an explanation of the embodiments of the present invention given with reference to the drawings.

Figure 1:
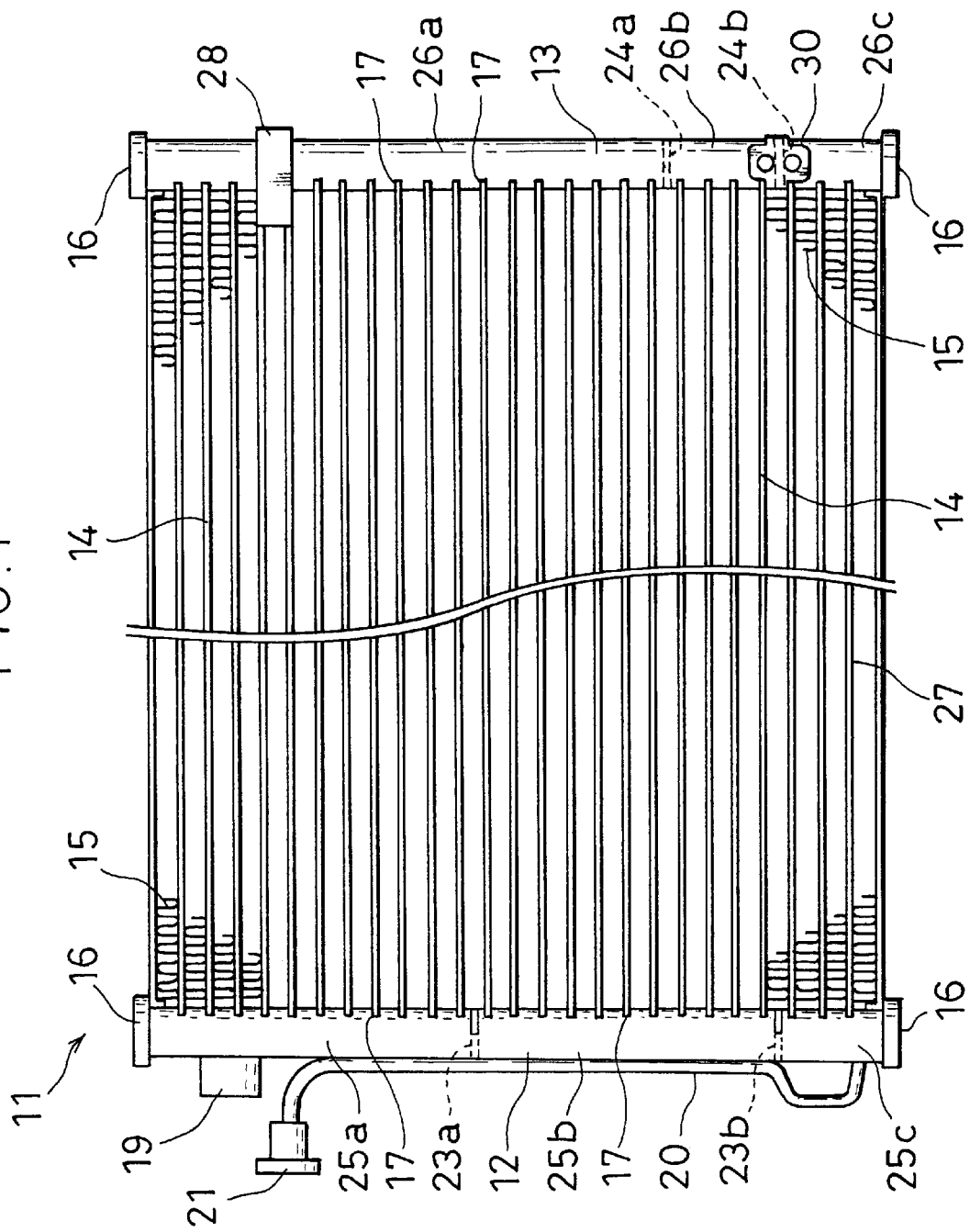
FIG. 1 is a front view of the condenser achieved in an embodiment of the present invention.

In FIG. 1, a condenser 11 utilized in an air-conditioning system for vehicles includes a pair of header pipes 12 and 13, a plurality of flat tubes 14 communicating between the pair of header pipes 12 and 13 and corrugated fins 15 inserted and bonded between the flat tubes 14. Under normal circumstances, the header pipes 12 and 13 are set to extend along the vertical direction as shown in the figure and air flowing perpendicular to the sheet of paper on which the figure is drawn is allowed to pass between the fins 15.

In the header pipes 12 and 13, each achieved by forming an aluminum material clad with a brazing material into a cylindrical shape to constitute a header main body and closing the openings at the two ends of the header main body with lids 16, numerous tube insertion holes 17 at which the flat tubes 14 are inserted are formed in alignment along the lengthwise direction and in the structural example adopted in the embodiment, an intake connector 19 through which a heat exchanging medium (coolant) flows in is connected at an upper position, and an output pipe 20 through which the heat exchanging medium flows out and its outlet connector 21 are connected at a lower position of one of the header pipes, i.e., the header pipe 2.

The header pipes 12 and 13, which are formed through cold drawing or by bending a plate material into a cylindrical shape, are partitioned by partitioning plates 23a and 23b and partitioning plates 24a and 24b respectively, and with the spaces inside them thus partitioned into a plurality of flow passage chambers 25a, 25b and 25c and flow passage chambers 26a, 26b and 26c respectively, various groups of flat tubes 14 are formed to allow the coolant to sequentially flow through the individual groups of flat tubes 14. In this embodiment, the so-called 3-pass flow in which the coolant achieves a serpentine flow from the header pipe 12 to the header pipe 13, then from the header pipe 13 to the header pipe 12 and again from the header pipe 12 to the header pipe 13 is adopted. The lowermost group of flat tubes 14 defined by the partitioning plates 23b and 24b constitutes a super cooling heat exchanging unit 27 that further cools down the liquefied coolant flowing out from a liquid tank 31 to be explained below.

At the header pipe 13, a bracket 28 for securing the liquid tank 31 is provided at an upper position and a connecting block 30 for connecting the liquid tank 31 is mounted at a lower position.

Figure 2:
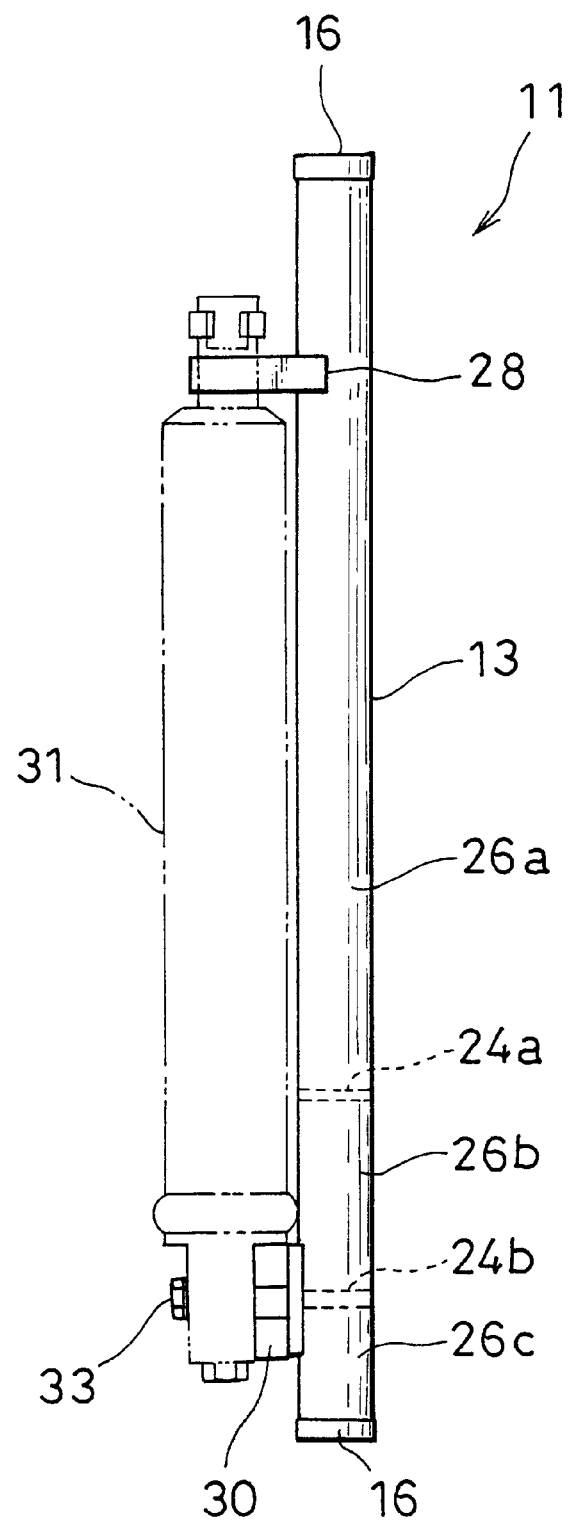
FIG. 2 presents an enlarged side view of the condenser in FIG. 1 having the liquid tank provided next to the header pipe.
Figure 3:
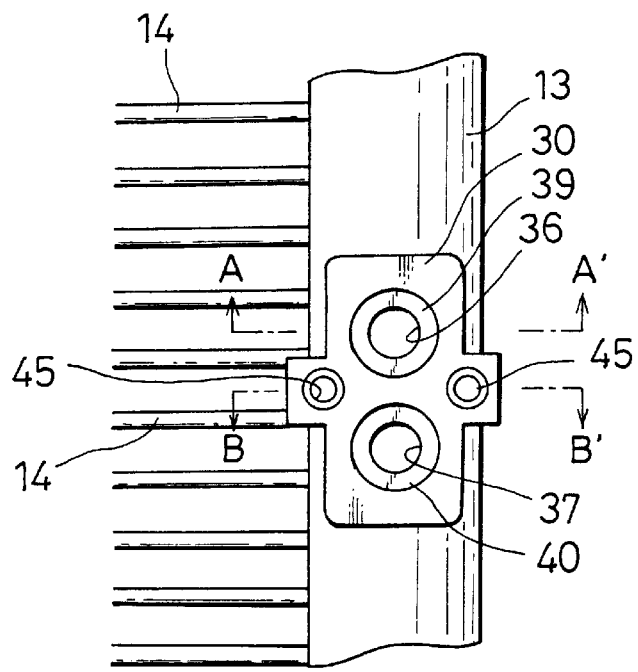
FIG. 3 presents an enlarged front view of an essential portion of the condenser, showing a state in which the connecting block is mounted at the header pipe.
Figure 4:
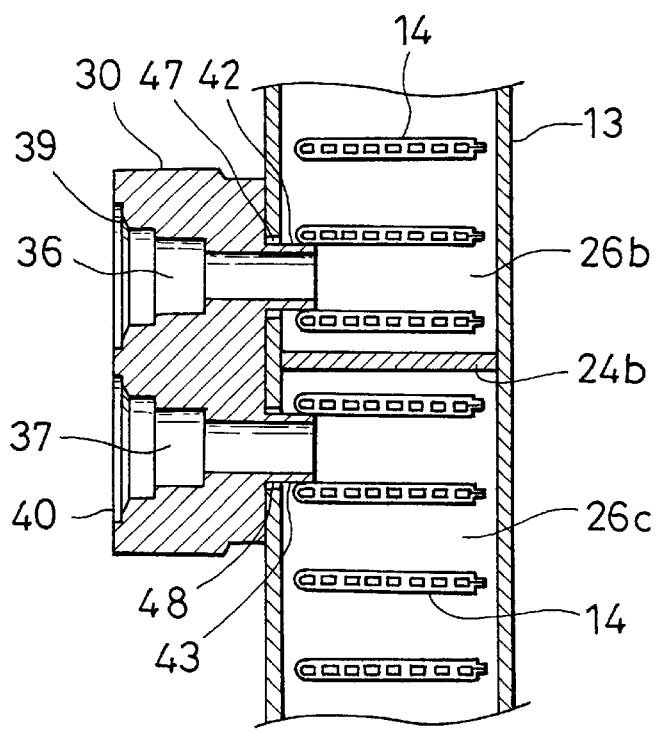
FIG. 4 presents an enlarged sectional view of the essential portion of condenser taken along the longitudinal direction.
Figure 5:
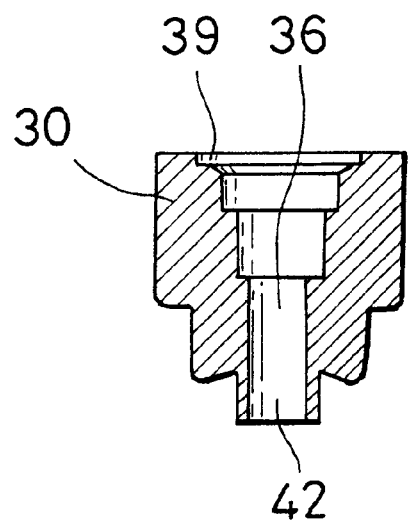
FIG. 5 is a sectional view of the connecting block shown in FIG. 3 taken along line A–A'.
Figure 6:
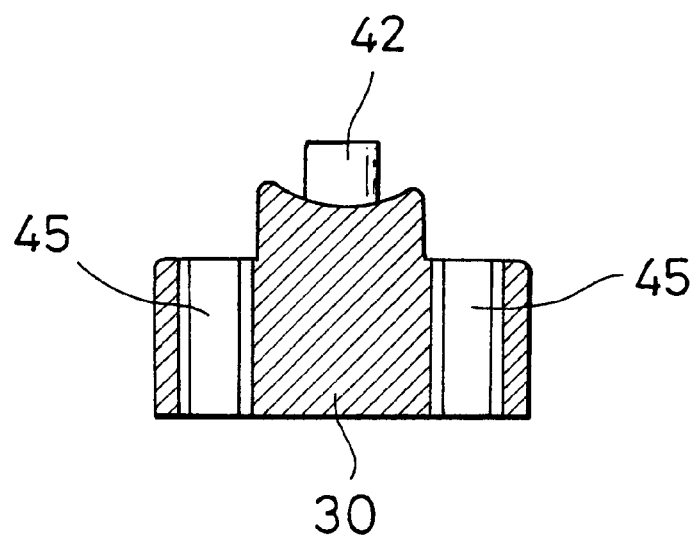
FIG. 6 is a sectional view of the connecting block shown in FIG. 3 taken along line B–B'.

In FIG. 2, which presents an enlarged side view of the condenser 11, the liquid tank 31 that is provided next to one of the header pipes, i.e., the header pipe 13, is held by the bracket 28 on one side and is interlocked and retained at screw holes 45 of the connecting block 30 via mounting screws 33 on the lower side. It is to be noted that although not shown, inside the liquid tank 31 is allowed to communicate with the flow passage chambers 26b and 26c of the header pipe 13 via intake/outlet communicating holes 36 and 37 formed at the connecting block 30.

In FIGS. 3 through 6, the connecting block 30 is a rectangular parallelopiped elongated in the vertical direction, in which two communicating holes 36 and 37 are formed. The pitch of the communicating holes 36 and 37 is an integral multiple of the pitch of the flat tubes 14.

Connecting stags 39 an 40 which gradually widen to facilitate connection to the liquid tank 31 are provided at the front sides (where the liquid tank is connected) of the communicating holes 36 and 37, and on the opposite sides of the communicating holes 36 and 37, i.e., on the side where the header pipe is connected, pipe-like projections 42 and 43 enclosing the communicating holes 36 and 37 project out. It goes without saying that O-rings which are sealing members, are mounted at the connecting stages 39 and 40 and that the pipe-like projections 42 and 43 are formed in a circular shape.

The distance over which the pipe-like projections 42 and 43 of the communicating holes 36 and 37 project out is set larger than the wall thickness of the header pipe 12, e.g., twice as large or even larger, and the diameter of the pipe-like projections 42 and 43 is set smaller than the distance between the individual flat tubes 14. As a result, when the pipe-like projections are inserted at the header pipe 13, they are set between flat tubes 14.

In addition, the middle section of the connecting block 30 projects out on both sides along the lateral direction, and screw holes 45 and 45 are formed in the projecting areas. These screw holes 45 and 45 are used when securing the liquid tank 31 with the mounting screw 33.

The connecting block 30 structured as described above is mounted at the header pipe 13 through a process during which the connecting block 30 is brazed together with the condenser 11. The mounting process is achieved by inserting the pipe-like projections 42 and 43 at holes 47 and 48 formed on the opposite sides from each other relative to the partitioning plate 24b of the header pipe 13, and since the diameter of the holes 47 and 48 is set larger than the external diameter of the pipe-like projections 42 and 43, the pipe-like projections 42 and 43 are inserted loosely and held through spot welding so that they are retained until the furnace brazing process. The pipe-like projections 42 and 43 are inserted between the flat tubes 14 without posing any interference.

When the connecting block 30, which is temporarily held to the header pipe 13, undergoes the furnace brazing process together with the condenser 1, the brazing material present at the surfaces of the flat tubes 14 melts to weld the flat tubes 14 to the fins 15, the brazing material at both the tubes 14 and the header pipe 13 melts to weld them together and the brazing material at the header pipe 13 melts to weld the connecting block 30 as well. During this process, the melted brazing material is not allowed to travel into the communicating holes 36 and 37 projecting into the header pipe 13, and thus no problem occurs.

Figure 7:
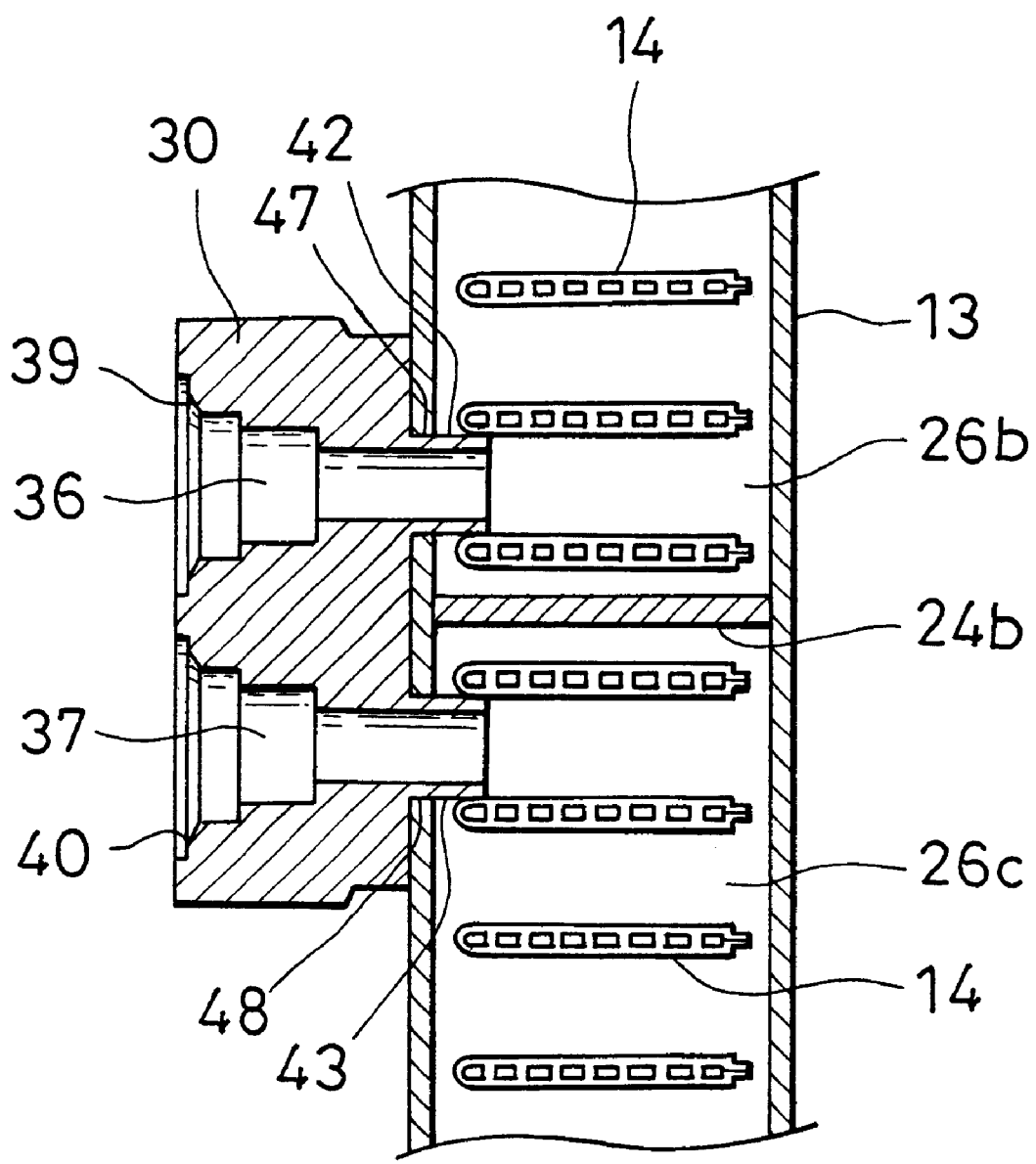
FIG. 7 is an enlarged sectional view taken along the longitudinal direction, showing another embodiment of the present invention in a state in which the connecting block is mounted at the header pipe.
Figure 8:
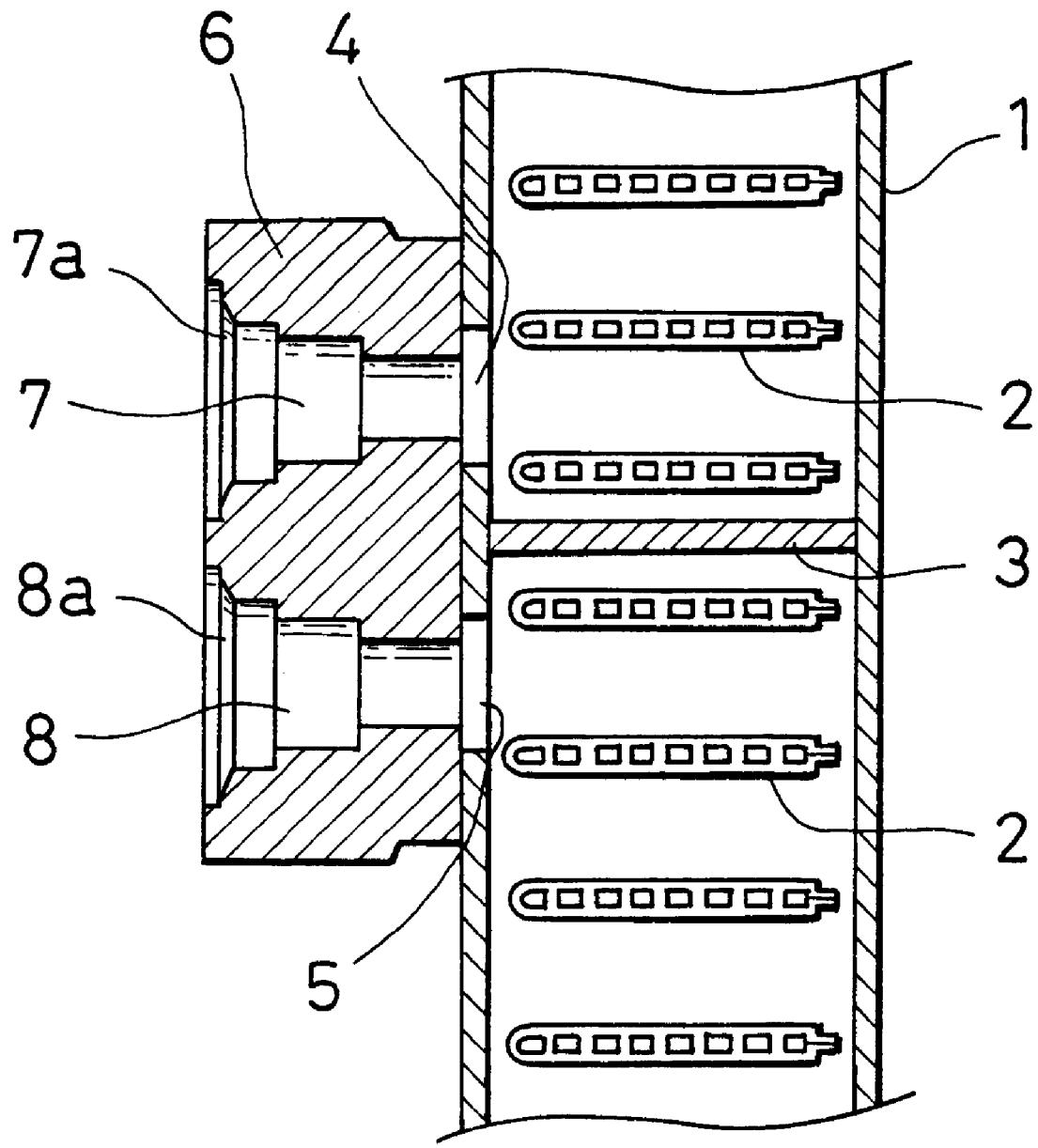
FIG. 8 presents a sectional view of a connecting block in the prior art mounted at the header pipe.

Another embodiment of the present invention which is illustrated in FIG. 7 differs from the previous embodiment in that the pipe-like projections 42 and 43 at the communicating holes 36 and 37 of the connecting block 30 are press fitted into the holes 47 and 48 of the header pipe 13. This embodiment which can be achieved simply by reducing the diameter of holes 47 and 48, achieves the temporary retention of the connecting block 30 prior to the furnace brazing process through press fitting. For this reason, the embodiment has an advantage of simplicity over the previous embodiment. It is to be noted that the same reference numerals are assigned to other portions to eliminate the necessity for a repeated explanation thereof.

Although not shown, the pipe-like projections 42 and 43 at the communicating holes 36 and 37 of the connecting block 30 may be formed so as to have a flat section in order to support reduced pitch of the flat tubes and to achieve an increase in the flow rate.

INDUSTRIAL APPLICABILITY

As explained above, according to the present invention in which the pipe-like projections at the communicating holes of the connecting block utilized for liquid tank connection are inserted at the holes formed at the header pipe to project into the holes, the melting brazing material from the header pipe does not enter the communicating holes during the furnace brazing process and thus, the function of the communicating holes is fully realized.

In addition, even though the pipe-like projections are allowed to project into the header pipe, they are inserted without presenting any interference to the flat tubes.

Furthermore, by inserting the pipe-like projections at the holes formed at the header pipe through press fitting, they can be utilized for temporary retention as well. Moreover, by forming the pipe-like projections so as to have a flat section instead of forming them in a circular shape, the pitch of the flat tubes can be reduced and the flow rate can be increased without posing problems.

What is claimed is:

1. In a condenser which is constituted by at least a pair of header pipes, a plurality of flat tubes communicating between said pair of header pipes, fins located between said flat tubes and partition plates partitioning an inside of each header pipe to form a plurality of flow passage chambers to constitute a plurality of flat tube groups, and having a main heat exchanging unit comprising said flat tube groups communicating in series, via said plurality of flow passage chambers, with said flow passage chamber in which a connector for an intake to an upstream end, and a super cooling heat exchanging unit constituted by a last flat tube group and said flow passage chambers located at both sides of said last flat tube group and independent from said main heat exchanging unit, in which a liquid tank is provided between said main heat exchanging unit and said super cooling heat exchanging unit, said condenser characterized in that:

a connecting block has a pair of communicating holes communicating with an intake and an outlet of said liquid tank, respectively;

one of said communicating holes communicating with said intake of said liquid tank is communicated with the flow passage chambers through a pipe-like projection extending at a specific length into the flow passage chamber positioned at a downstream end of said main heat exchanging unit;

another of said communicating holes communicating with said outlet of said liquid tank is communicated with the flow passage chambers through a pipe-like projection extending at a specific length into the flow passage chamber positioned at an upstream end of said super cooling heat exchanging unit; and each of said pipe-like projections extends between said flat tubes inserted and fixed in said header pipe.

2. A condenser according to claim 1, characterized in that:

the pitch of said pipe-like projections at said pair of communicating passages formed at said connecting block is an integral multiple of the pitch of flat tubes inserted at and connected to said header pipe.

3. A condenser according to claim 2, characterized in that:

said pipe-like projections at said communicating passages of said connecting block are formed so as to have a circular section.

4. A condenser according to claim 2, characterized in that:

said pipe-like projections at said communicating passages of said connecting block are formed so as to have a flat section.

5. A condenser according to claim 2, characterized in that:

a side surface of said connecting block on which said pipe-like projections are formed is formed concavely along said header pipe.

6. A condenser according to claim 1, characterized in that:

said pipe-like projections at said communicating passages of said connecting block are loosely inserted at said holes formed at said header pipe.

7. A condenser according to claim 6, characterized in that:

said pipe-like projections at said communicating passages of said connecting block are formed so as to have a circular section.

8. A condenser according to claim 6, characterized in that:

said pipe-like projections at said communicating passages of said connecting block are formed so as to have a flat section.

9. A condenser according to claim 6, characterized in that:

a side surface of said connecting block on which said pipe-like projections are formed is formed concavely along said header pipe.

10. A condenser according to claim 1, characterized in that:

said pipe-like projections at said communicating passages of said connecting block are fitted in said holes formed at said header pipe through press fitting.

11. A condenser according to claim 10, characterized in that:

said pipe-like projections at said communicating passages of said connecting block are formed so as to have a circular section.

12. A condenser according to claim 10, characterized in that:

said pipe-like projections at said communicating passages of said connecting block are formed so as to have a flat section.

13. A condenser according to claim 10, characterized in that:

a side surface of said connecting block on which said pipe-like projections are formed is formed concavely along said header pipe.

14. A condenser according to claim 1, characterized in that:

the distance over which said pipe-like projections at said communicating passages of said connecting block project out is set larger than the wall thickness of said header pipe.

15. A condenser according to claim 14, characterized in that:

said pipe-like projections at said communicating passages of said connecting block are formed so as to have a circular section.

16. A condenser according to claim 14, characterized in that:

said pipe-like projections at said communicating passages of said connecting block are formed so as to have a flat section.

17. A condenser according to claim 14, characterized in that:

a side surface of said connecting block on which said pipe-like projections are formed is formed concavely along said header pipe.

18. A condenser according to claim 1, characterized in that:

said pipe-like projections at said communicating passages of said connecting block are formed so as to have a circular section.

19. A condenser according to claim 1, characterized in that:

said pipe-like projections at said communicating passages of said connecting block are formed so as to have a flat section.

20. A condenser according to claim 1, characterized in that:

a side surface of said connecting block on which said pipe-like projections are formed is formed concavely along said header pipe.

* * * * *